March 23, 1965   M. A. SULLIVAN   3,174,711
WING STRUCTURE
Filed Aug. 19, 1963
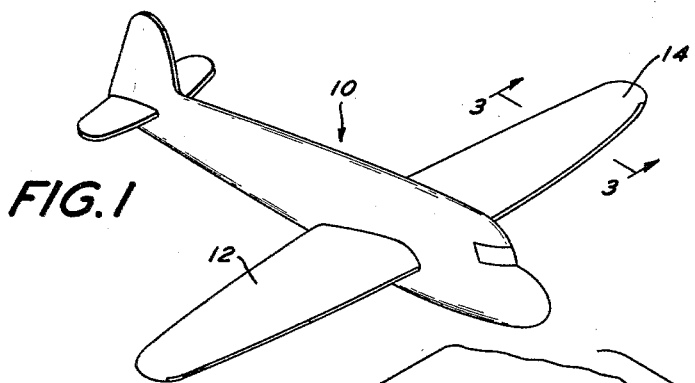
FIG. 1
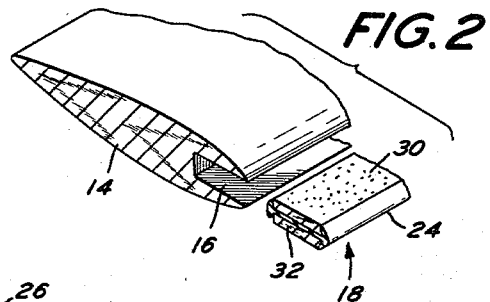
FIG. 2
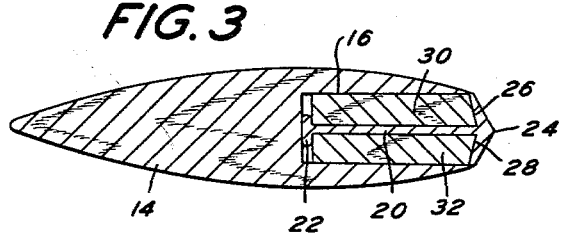
FIG. 3
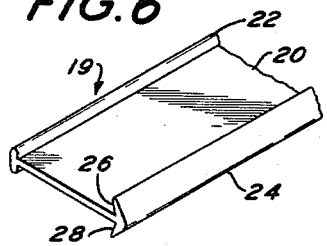
FIG. 6
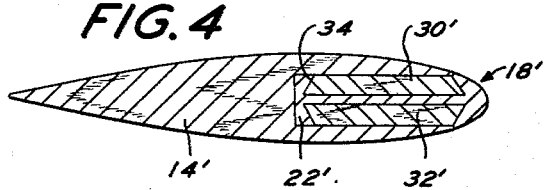
FIG. 4
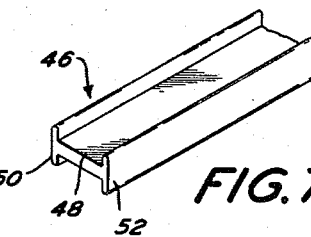
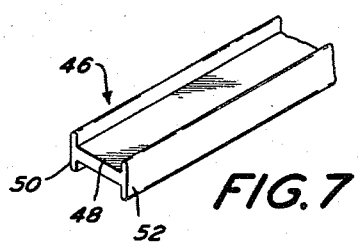
FIG. 5
FIG. 7
INVENTOR.
MATTHEW A. SULLIVAN
BY Arthur H. Seidel
ATTORNEY

United States Patent Office 3,174,711
Patented Mar. 23, 1965

3,174,711
WING STRUCTURE
Matthew A. Sullivan, 2300 Stratford Ave.,
Willow Grove, Pa.
Filed Aug. 19, 1963, Ser. No. 302,992
12 Claims. (Cl. 244—123)

This invention relates generally to glider-type airplanes having a wing structure in accordance with the present invention.

The glider-type airplanes may be model airplanes or they may be sufficiently large so as to have occupants therein. The present invention is directed to improving the leading edge of wing structure for glider-type airplanes. The leading edge of wing structure is the surface which is subject to the greatest amount of wear. In accordance with the present invention, an insert may be provided which is sufficiently light in weight and yet resistant to wearing forces whereby the insert may be incorporated in the wing structure and define the leading edge of the wing structure.

It is an object of the present invention to provide a glider-type vehicle capable of flight and having novel wing structure.

It is another object of the present invention to provide a novel wing structure for glider-type vehicles capable of flight wherein a metallic leading edge may be provided for wooden wings.

It is another object of the present invention to provide novel wing structure for model airplanes.

It is another object of the present invention to provide leading edge structure for wings which are hollow or solid.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view of the glider-type vehicle capable of flight.

FIGURE 2 is a partial exploded view of one wing of the glider-type vehicle of FIGURE 1.

FIGURE 3 is a sectional view taken along line 3—3 in FIGURE 1.

FIGURE 4 is a sectional view similar to FIGURE 3 but illustrating another embodiment of the present invention.

FIGURE 5 is a sectional view similar to FIGURE 3 but illustrating another embodiment of the present invention.

FIGURE 6 is a partial perspective view of a substrate illustrated in FIGURES 2 and 3.

FIGURE 7 is a partial perspective view of another substrate in accordance with the present invention.

Referring to the drawing in detail, where like numerals indicate like elements, there is shown in FIGURE 1 an airplane designated generally as 10 which may be a real or model glider or model airplane having its own power plant.

The airplane 10 is provided with wings 12 and 14. Each of the wings are identical. Accordingly, only wing 14 will be described in detail. As illustrated, wing 14 is a solid balsa wood or the like and is provided with a slot 16 along its front edge.

The slot 16 is adapted to receive an insert designated generally as 18. Insert 18 carries the leading edge 24 for the wing 14 as will be made clear hereinafter.

Insert 18 includes a substrate designated generally as 19. Substrate 19 may be made from a variety of lightweight non-corrosive materials such as aluminum, magnesium, various plastics, etc. In actual practice, I have made the insert 19 out of extruded magnesium. The insert 19 includes a plate 20 having a flange 22 along one edge and flanges along the opposite edge to form the leading edge 24. The last-mentioned flanges forming the leading edge 24 are provided with undercut surfaces 26 and 28.

The upper and lower surfaces of the plate 20 are preferably roughened. Thereafter, filler strips 30 and 32 are slid into the space between the flanges endwise so that the undercuts on the surfaces 26 and 28 act as a locking member. Adhesive or epoxy resin is applied to the upper and lower surfaces of the plate 20 to bond the filler strips 30 and 32 thereto. The roughness of the surfaces on the plate 20 facilitate the provision of good bond between plate 20 and the filler strips.

Thereafter, adhesive or the like is applied to the exposed surfaces on the filler strips 30 and 32. When the insert 18 is inserted into the slot 16, the filler strips 30 and 32 will be bonded by the adhesive to the surfaces of the wing 14 defining the slot 16. Filler strips 30 and 32 are preferably balsa wood when wing 14 is made from balsa wood.

A variety of procedures are available for roughening the surfaces of the plate 20. For example, the surfaces of plate 20 may be roughened by acid etchings, shot peening, etc. The locking effect attained by the undercut of surfaces 26 and 28 reinforces the joint between filler strips 30 and 32 and the plate 20. Since the leading edge of the wing 14 will now be the metal leading edge 24 of the substructure 19, wing 14 is subject to less wear on its leading edge and breakage due to contact with other structures.

In FIGURE 4, there is illustrated a sectional view of a wing which is similar to the sectional view of wing 14 in FIGURE 3. Hence corresponding elements will be provided with primed numerals in the illustration of FIGURE 4. The insert 18' is identical with the insert 18 except that the flange 22' is provided with undercut surfaces such as surface 34. Otherwise the illustration in FIGURE 4 is identical with that described above and therefore additional comments are not deemed necessary.

In FIGURE 5, there is allustrated a sectional view of a hollow wing having an insert designated generally as 36 for its leading edge. The insert 36 is substantially identical with the insert 18' and differs therefrom by the increased height and contour of the filler strips 38 and 40. The sheets 42 and 44 are bonded to the upper and lower exposed surfaces of the filler strips 38 and 40. Sheets 42 and 44 may be thin balsa wood, plastic metal foil, etc. Otherwise, the illustration in FIGURE 5 is identical with that described above.

In FIGURE 7, there is illustrated a substrate 46 which is similar to the substrate 19 illustrated in FIGURE 6. Substrate 46 includes a plate 48 having flanges 50 and 52 along the opposite edges thereof. Flanges 50 and 52 are substantially parallel to each other and may have undercut surfaces such as those described above. The leading edge of the substrate 46 is the exposed surface of the flange 50 which is substantially flat as opposed to the curved or V-shaped contour of the leading edges described above. The substrate 46 may be utilized as described above.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a flight vehicle having wings, said wings having a space for receiving an insert at the leading edge thereof, an insert in said space, said insert including a plate having oppositely directed flanges along opposite edges thereof, filler strips secured to opposite sides of said plate adjacent the flanges and means securing the filler strips to the juxtaposed components of the wings.

2. Apparatus in accordance with claim 1 wherein said plate and its flanges are integral and made from a lightweight metal.

3. Apparatus in accordance with claim 2 wherein said metal is magnesium.

4. Apparatus comprising a flight vehicle having wings, said wings having a space for receiving an insert at the leading edge thereof, an insert in said space, said insert including a plate having oppositely directed flanges along its leading edge, filler strips secured to opposite sides of said plate adjacent the flanges and means securing the filler strips to the juxtaposed components of the wings, said filler strips are balsa wood, and said wings being made from balsa wood.

5. Apparatus in accordance with claim 1 wherein at least one of the flanges is undercut so as to partially overlie the filler strip juxtaposed thereto.

6. Apparatus comprising a wing for a flight vehicle, said wing being solid balsa wood, said wing having a slot for receiving an insert at the leading edge thereof, an insert in said slot, said insert including a plate having oppositely directed flanges along opposite edges thereof, a separate filler strip secured to each side of the plate, and means securing the insert in the slot.

7. Apparatus in accordance with claim 6 wherein the plate and flanges are made from a lightweight material, and said filler strips being made from balsa wood.

8. Apparatus in accordance with claim 6 wherein said filler strips are balsa wood, said plate having roughened surfaces juxtaposed to the filler strips, and said filler strips being secured to the plate by an adhesive.

9. Apparatus in accordance with claim 6 wherein at least one flange on opposite sides of said plate overlies a portion of the adjacent filler strip.

10. An insert adapted to be received in the leading edge of a wing of a flight vehicle comprising a plate, said plate having oppositely directed flanges along opposite edges thereof, a separate filler strip secured to each side of said plate, at least one pair of said oppositely directed flanges along one edge of said plate being undercut so as to partially overlie the filler strip juxtaposed thereto.

11. An insert in accordance with claim 10 wherein both pairs of oppositely directed flanges along opposed edges of said plate are undercut.

12. An insert adapted to be seated in the leading edge of a wing of a flight vehicle comprising a plate, said plate having oppositely directed flanges along opposite edges thereof, and a separate filler strip secured to each side of said plate between a pair of said flanges which extend from the same direction from the opposite edges of said plate.

References Cited by the Examiner
UNITED STATES PATENTS

| | | | |
|---|---|---|---|
| 1,674,674 | 6/28 | Wooster | 170—159 |
| 2,155,375 | 4/39 | Jablonsky | 170—159 |
| 2,555,670 | 6/51 | Babcock | 46—76 X |
| 2,734,586 | 2/56 | Wright et al. | 244—123 X |
| 3,145,000 | 8/64 | Mackie | 244—123 |

FERGUS S. MIDDLETON, *Primary Examiner.*